United States Patent
Baptist et al.

(10) Patent No.: US 11,895,098 B2
(45) Date of Patent: Feb. 6, 2024

(54) STORING ENCRYPTED CHUNKSETS OF DATA IN A VAST STORAGE NETWORK

(71) Applicant: Pure Storage, Inc., Mountain View, CA (US)

(72) Inventors: Andrew D. Baptist, Mt. Pleasant, WI (US); Greg R. Dhuse, Chicago, IL (US); Wesley B. Leggette, Chicago, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

(21) Appl. No.: 17/937,286

(22) Filed: Sep. 30, 2022

(65) Prior Publication Data

US 2023/0025990 A1      Jan. 26, 2023

Related U.S. Application Data

(63) Continuation of application No. 16/858,839, filed on Apr. 27, 2020, now Pat. No. 11,463,420, which is a
(Continued)

(51) Int. Cl.
*H04L 9/40* (2022.01)
*H04L 67/10* (2022.01)
(Continued)

(52) U.S. Cl.
CPC .......... *H04L 63/0428* (2013.01); *G06F 3/064* (2013.01); *G06F 3/067* (2013.01);
(Continued)

(58) Field of Classification Search
CPC ... H04L 63/0428; H04L 9/0825; H04L 9/085; H04L 9/0894; H04L 67/10; H04L 67/1097; G06F 3/0619; G06F 3/064; G06F 3/067
See application file for complete search history.

(56) References Cited

U.S. PATENT DOCUMENTS 4,092,732 A    5/1978   Ouchi
5,454,101 A    9/1995   Mackay
(Continued)

FOREIGN PATENT DOCUMENTS

EP     1903750 A1     3/2008

OTHER PUBLICATIONS

Chung; An Automatic Data Segmentation Method for 3D Measured Data Points; National Taiwan University; pp. 1-8; 1998.
(Continued)

*Primary Examiner* — Yonas A Bayou
(74) *Attorney, Agent, or Firm* — Garlick & Markison; Timothy W. Markison; Kelly H. Hale

(57) ABSTRACT

A method for execution by one or more processing modules of one or more computing devices begins by encoding data using a dispersed storage error encoding function to produce a plurality of sets of encoded data slices arranged into a plurality of chunksets of encoded data slices. The method continues by selecting a set of storage units for storing the plurality of chunksets and assigning a distributed computing task to each storage unit of the set of storage units. The method then continues by generating a unique key set for each storage unit of the storage units, encrypting each chunkset of encoded data slices with a corresponding one of the unique key sets to produce a plurality of encrypted chunksets and sending an encrypted chunkset of the plurality of encrypted chunksets and an indication of a corresponding distributed computing task to each storage unit of the set of storage units for storage of the encrypted chunksets and execution of the distributed computing task.

20 Claims, 6 Drawing Sheets

Related U.S. Application Data continuation of application No. 15/824,433, filed on Nov. 28, 2017, now abandoned, which is a continuation-in-part of application No. 15/418,164, filed on Jan. 27, 2017, now Pat. No. 10,447,662, which is a continuation of application No. 13/917,017, filed on Jun. 13, 2013, now Pat. No. 9,674,155, which is a continuation-in-part of application No. 13/707,428, filed on Dec. 6, 2012, now Pat. No. 9,298,548.

(60) Provisional application No. 61/679,007, filed on Aug. 2, 2012, provisional application No. 61/569,387, filed on Dec. 12, 2011.

(51) Int. Cl.
*H04L 9/08* (2006.01)
*H04L 67/1097* (2022.01)
*G06F 3/06* (2006.01)
*G06F 11/10* (2006.01)
*H03M 13/15* (2006.01)

(52) U.S. Cl.
CPC ............ *G06F 3/0619* (2013.01); *H04L 9/085* (2013.01); *H04L 9/0825* (2013.01); *H04L 9/0894* (2013.01); *H04L 67/10* (2013.01); *H04L 67/1097* (2013.01); *G06F 11/1076* (2013.01); *G06F 2211/1028* (2013.01); *H03M 13/1515* (2013.01); *H04L 2463/061* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,490,353 B1 | 12/2002 | Tan | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 * | 12/2006 | Redlich | H04L 63/0428 713/166 |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,480,909 B2 | 1/2009 | McKean et al. | |
| 7,636,724 B2 | 12/2009 | de la Torre | |
| 9,848,044 B2 * | 12/2017 | Leggette | G06F 3/0614 |
| 9,998,538 B2 * | 6/2018 | Kazi | G11C 29/44 |
| 2001/0021186 A1 | 9/2001 | Ono | |
| 2002/0062422 A1 | 5/2002 | Butterworth | |
| 2002/0091975 A1 * | 7/2002 | Redlich | H04L 63/0428 714/699 |
| 2002/0099959 A1 * | 7/2002 | Redlich | G06F 21/554 713/150 |
| 2002/0144153 A1 | 10/2002 | LeVine | |
| 2002/0166079 A1 | 11/2002 | Ulrich | |
| 2003/0018927 A1 | 1/2003 | Gadir | |
| 2003/0037261 A1 * | 2/2003 | Meffert | H04N 21/4405 726/5 |
| 2003/0065617 A1 | 4/2003 | Watkins | |
| 2003/0084020 A1 | 5/2003 | Shu | |
| 2003/0115364 A1 * | 6/2003 | Shu | H04L 45/00 709/246 |
| 2003/0163507 A1 | 8/2003 | Chang et al. | |
| 2004/0024963 A1 | 2/2004 | Talagala | |
| 2004/0052369 A1 | 3/2004 | Stebbings | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0030918 A1 | 2/2007 | Kobayashi | |
| 2007/0050543 A1 | 3/2007 | Pomerantz | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 * | 12/2007 | Venters, III | H04L 9/0866 713/189 |
| 2008/0115143 A1 * | 5/2008 | Shimizu | G06F 9/5066 718/105 |
| 2008/0212776 A1 | 9/2008 | Motoyama | |
| 2009/0041244 A1 | 2/2009 | Lee | |
| 2009/0094251 A1 | 4/2009 | Gladwin | |
| 2009/0094318 A1 | 4/2009 | Gladwin | |
| 2009/0217385 A1 | 8/2009 | Teow | |
| 2010/0023524 A1 | 1/2010 | Gladwin | |
| 2010/0268877 A1 | 10/2010 | Resch | |
| 2011/0029524 A1 | 2/2011 | Baptist | |
| 2011/0071988 A1 | 3/2011 | Resch | |
| 2011/0072321 A1 | 3/2011 | Dhuse | |
| 2011/0138192 A1 * | 6/2011 | Kocher | H04L 9/088 713/189 |
| 2011/0185258 A1 | 7/2011 | Grube et al. | |
| 2011/0264717 A1 | 10/2011 | Grube et al. | |
| 2011/0314058 A1 * | 12/2011 | Motwani | G06F 11/0727 707/E17.108 |
| 2018/0083930 A1 * | 3/2018 | Baptist | H04L 63/0428 |
| 2019/0012234 A1 * | 1/2019 | Grube | G06F 3/0659 |

OTHER PUBLICATIONS

Communication pursuant to Article 94(3) EPC; EP Application No. 12856963.9; dated May 26, 2017; 9 pages.

(56) References Cited

OTHER PUBLICATIONS

Editor: Valerie Illingworth for Market House Books, The Penguin Dictionary of Electronics, 1998, Penguin Group, Third Edition, Pertinent pp. 349 and 447.

European Patent Office; Extended Search Report; EP Application No. 12856963.9; dated Jun. 23, 2015; 7 pgs.

Harrison; Lightweight Directory Access Protocol (LDAP): Authentication Methods and Security Mechanisms; IETF Network Working Group; RFC 4513; Jun. 2006; pp. 1-32.

International Business Machines; Response to EP communication dated May 26, 2017; dated Nov. 1, 2017; 5 pgs.

International Search Report and Written Opinion; International Search Authority; International Application No. PCT/US12/68883; dated Feb. 26, 2013; 12 pgs.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

LEGG; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

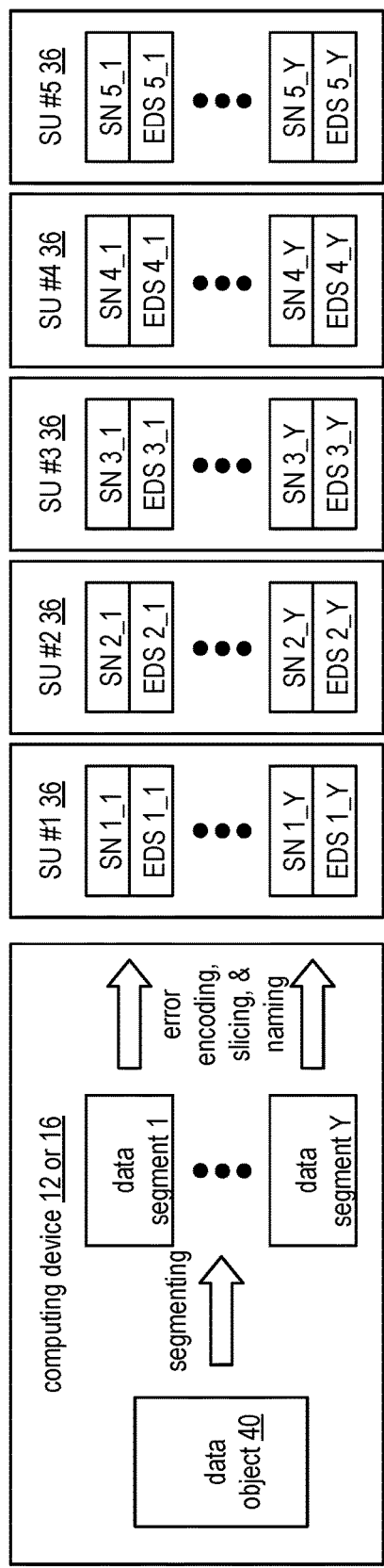
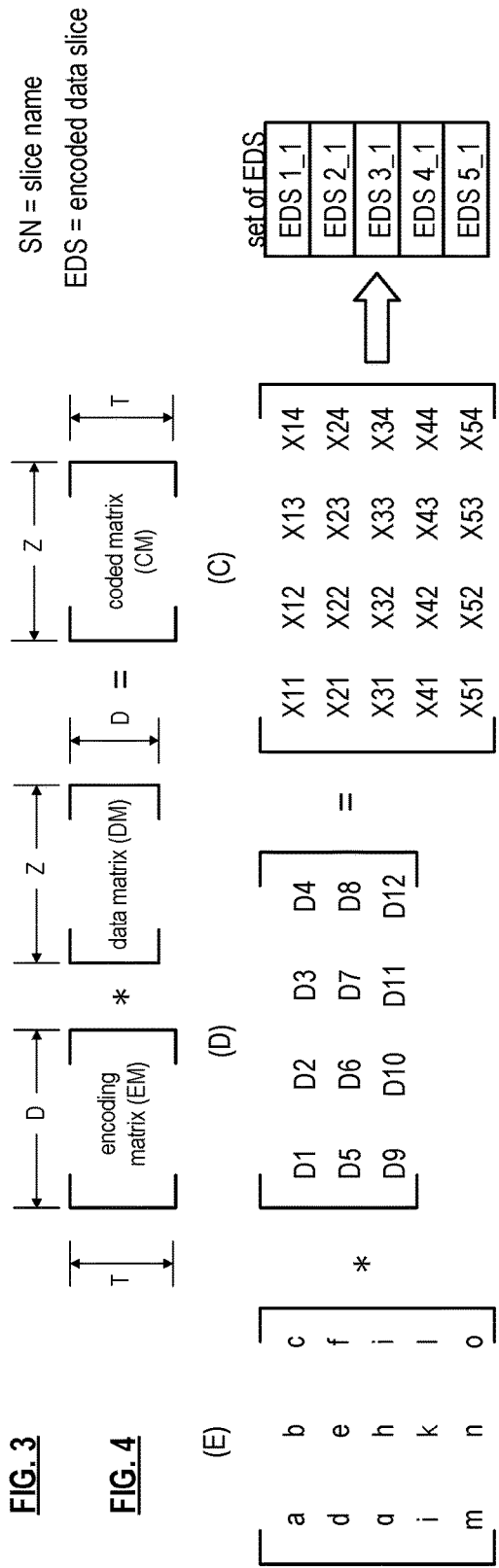
FIG. 3
FIG. 4
FIG. 5
FIG. 6

STORING ENCRYPTED CHUNKSETS OF DATA IN A VAST STORAGE NETWORK

CROSS-REFERENCE TO RELATED APPLICATIONS

The present U.S. Utility patent application claims priority pursuant to 35 U.S.C. § 120 as a continuation of U.S. Utility application Ser. No. 16/858,839, entitled "STORAGE UNIT PARTIAL TASK PROCESSING", filed Apr. 27, 2020, which is a continuation of U.S. Utility application Ser. No. 15/824,433, entitled "READS FOR DISPERSED COMPUTATION JOBS" filed Nov. 28, 2017, which is a continuation-in-part of U.S. Utility application Ser. No. 15/418,164, entitled "ENCRYPTING SEGMENTED DATA IN A DISTRIBUTED COMPUTING SYSTEM" filed Jan. 27, 2017, issued as U.S. Pat. No. 10,447,662 on Oct. 15, 2019, which is a continuation of U.S. Utility application Ser. No. 13/917,017, entitled "ENCRYPTING SEGMENTED DATA IN A DISTRIBUTED COMPUTING SYSTEM", filed Jun. 13, 2013, issued as U.S. Pat. No. 9,674,155 on Jun. 6, 2017, which is a continuation-in-part of U.S. Utility application Ser. No. 13/707,428, entitled "DISTRIBUTED COMPUTING IN A DISTRIBUTED STORAGE AND TASK NETWORK", filed Dec. 6, 2012, issued as U.S. Pat. No. 9,298,548 on Mar. 29, 2016, which claims priority pursuant to 35 U.S.C. § 119(e) to U.S. Provisional Application No. 61/569,387, entitled "DISTRIBUTED STORAGE AND TASK PROCESSING", filed Dec. 12, 2011, all of which are hereby incorporated herein by reference in their entirety and made part of the present U.S. Utility patent application for all purposes.

U.S. Utility application Ser. No. 13/917,017 also claims priority pursuant to 35 U.S.C. § 119(e) to U.S. Provisional Application No. 61/679,007, entitled "TASK PROCESSING IN A DISTRIBUTED STORAGE AND TASK NETWORK", filed Aug. 2, 2012, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
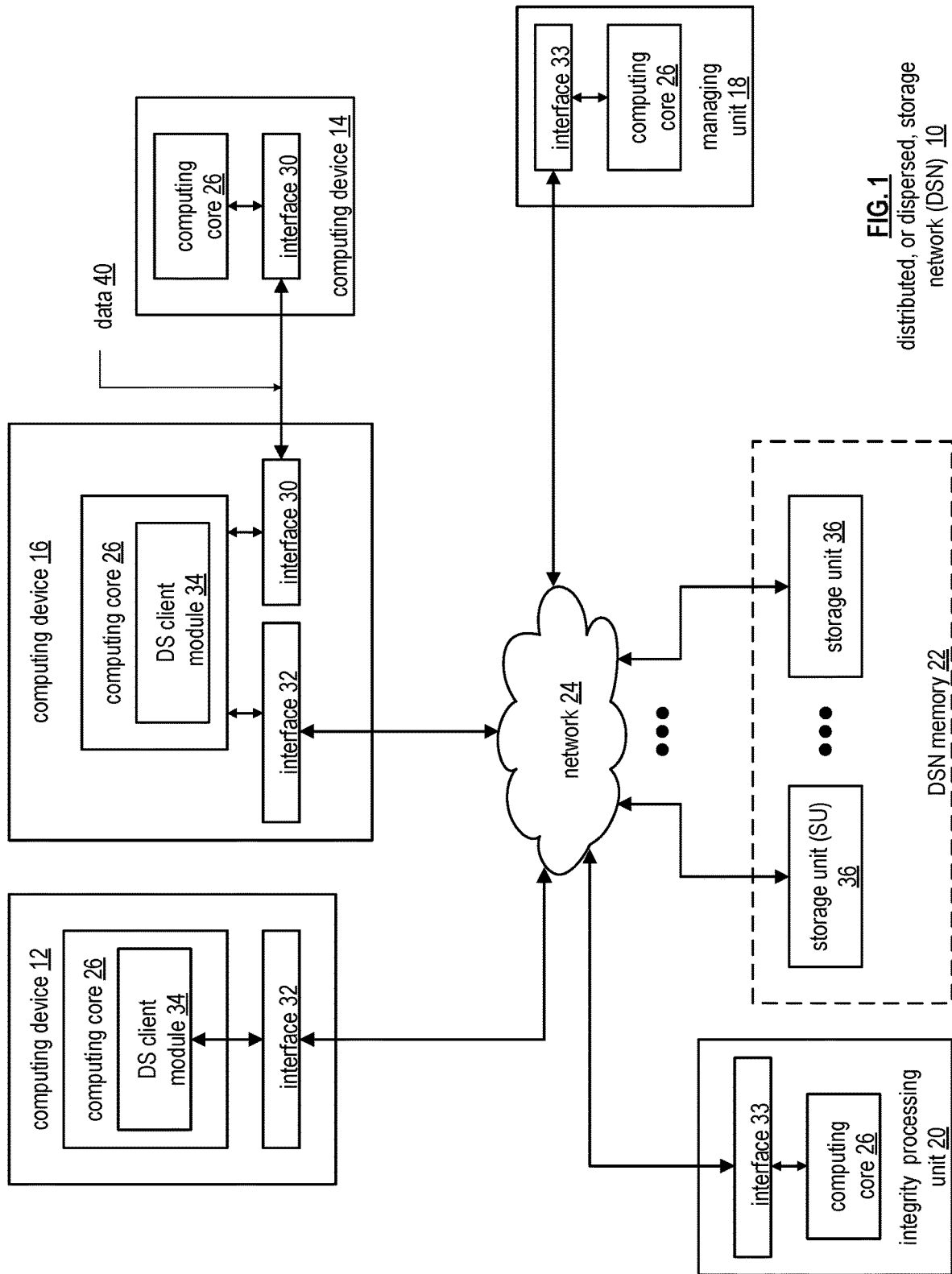
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
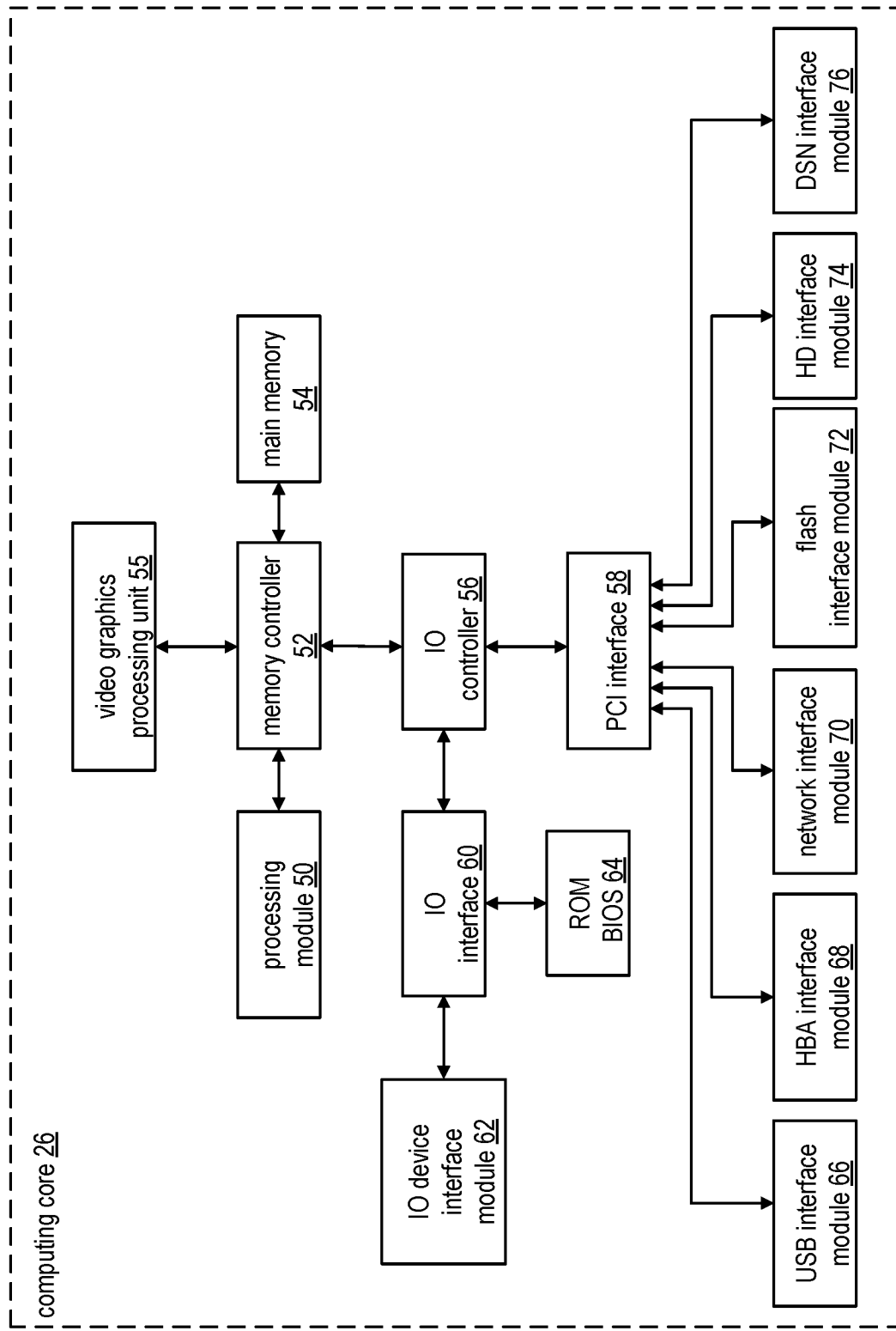
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9A. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
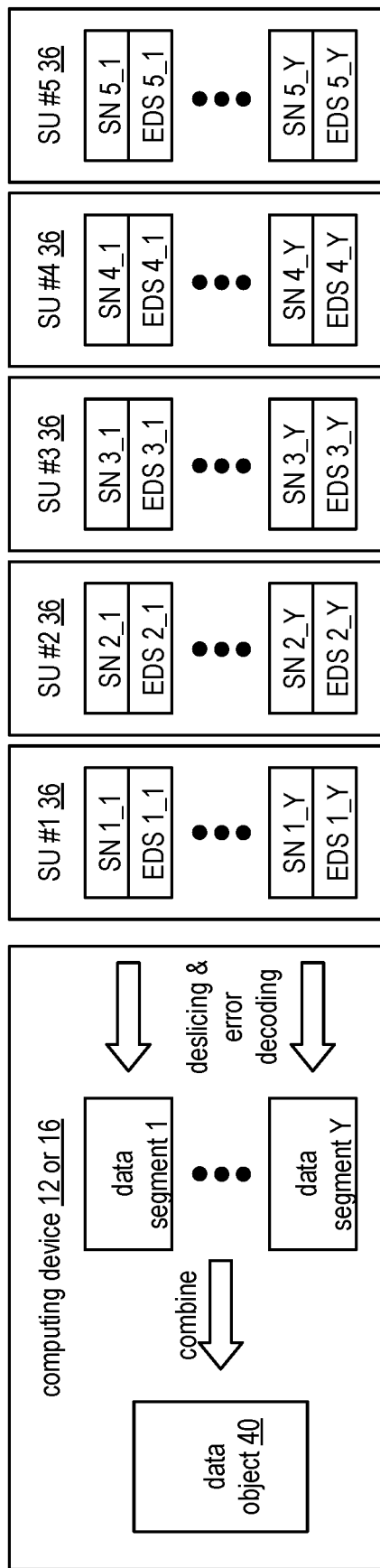
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
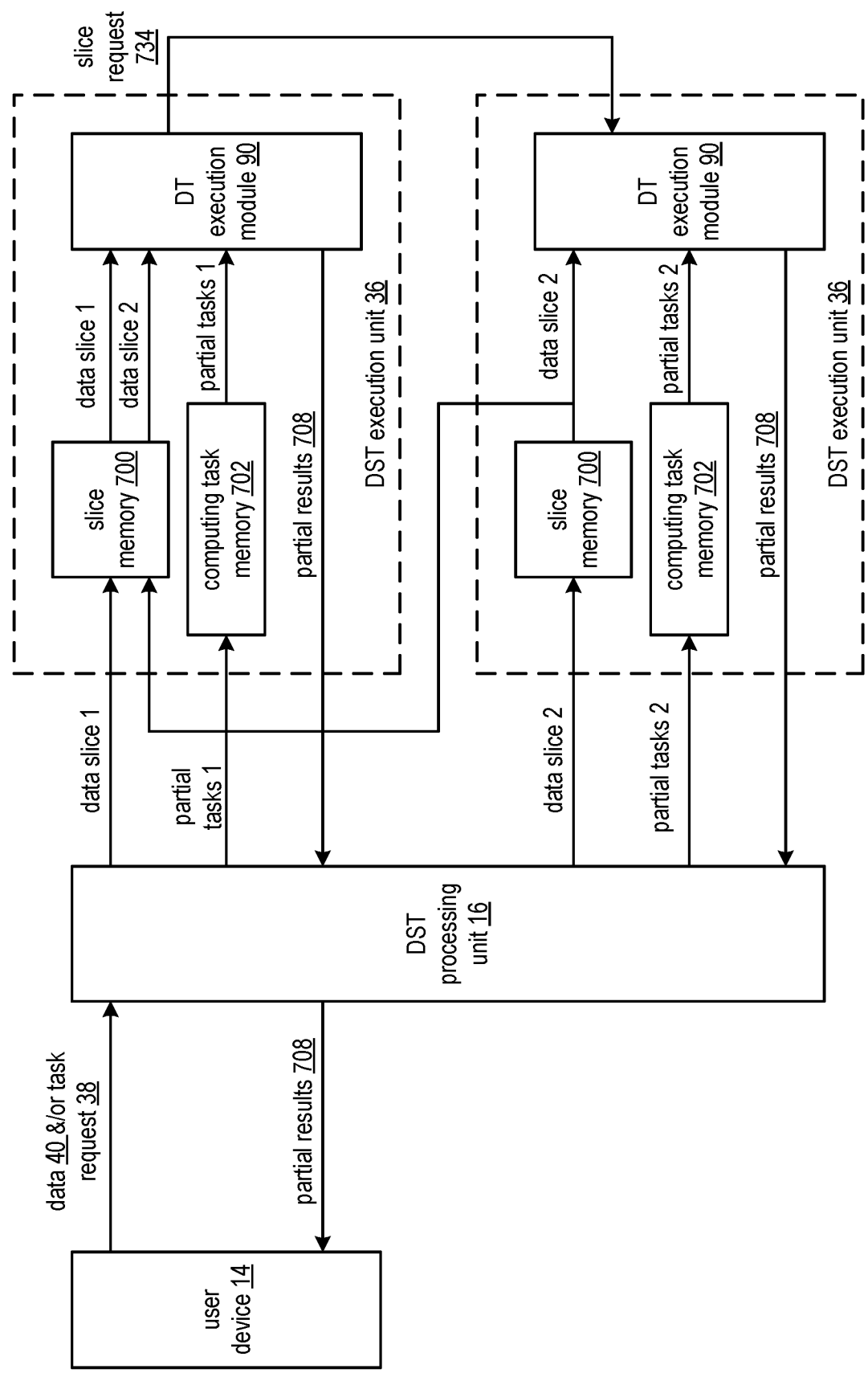
FIG. 9 is a schematic block diagram of another embodiment of a distributed computing system in accordance with the present invention.
Figure 9A:
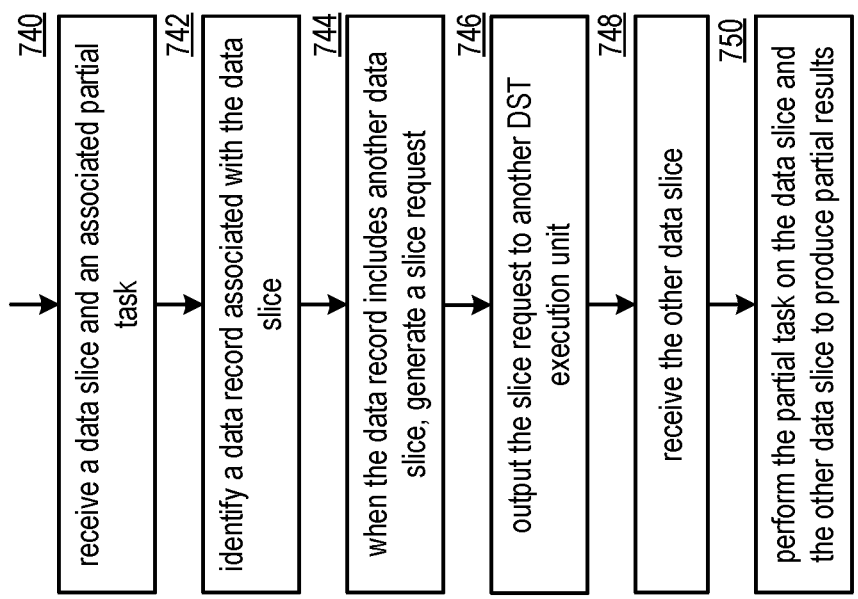
FIG. 9A is a flowchart illustrating an example of obtaining a data record in accordance with the present invention.

In one embodiment, during a dispersed computation job, a data record may cross boundaries of a slice stream, and require reading from adjacent DST units. To limit potential harm, a DST may enforce restrictions regarding how much adjacent data a neighboring DST may read of its data. For example, if records are known to never exceed 1 MB, a DST may limit the ability of an adjacent DST to read more than 1 MB of data. FIGS. 9 and 9A, describe a system and method for handling these adjacent reads (proxied reads) to complete tasks (e.g., partial tasks).

FIG. 9 is a schematic block diagram of another embodiment of a distributed computing system that includes a user device 14 (computing device), a distributed storage and task (DST) processing unit 16 (computing device), and at least two DST execution units 36 (storage units). Each DST execution unit 36 and the at least two DST execution units 36 includes a slice memory 700, a computing task memory 702, and a distributed task (DT) execution module 90. The system functions to generate data slices for partial task execution to produce partial results 708.

The DS processing unit 16 receives data 40 and/or a task request 38 and encodes data 40 to produce at least two groups of data slices 1-2 and produces at least two groups of partial tasks 1-2 associated with the task request 38. The data 40 may include a plurality of data records. The DST processing unit 16 may encode a data record of the plurality of data records to produce a last slice of a first group of data slices 1 and a first slice of a second group of data slices 2. A first group of partial tasks 1 may include a partial task associated with the data record. The DST processing unit 16 sends the at least two groups of data slices 1-2 and at least two groups of partial tasks 1-2 to a first DST execution unit 36 of the at least two DST execution units 36. The first DST execution unit 36 stores data slices 1 in the slice memory 700 of the first DST execution of 36 and stores the partial tasks 1 in the computing task memory 702 of the first DST execution unit 36.

The DT execution module 90 of the first DST execution unit 36 retrieves data slices 1 from the slice memory 700 and retrieves partial tasks 1 from the computing task memory 702. The DT execution module 90 determines whether the slice memory 700 contains every data slice required to execute partial tasks 1. When the DT execution module 90 determines that slice memory does not contain every data slice required to execute partial tasks 1, the DT execution module 90 identifies at least one other data slice. For example, the DT execution module identifies a first slice of the data slices 2 when a data record associated with a partial task 1 includes a last slice of the data slices 1 and the first slice of the data slices 2. The DT execution module 90 generates a slice request 734 to obtain the at least one other data slice from another DST execution unit 36. The slice request 734 includes one or more of a slice name associated with the at least one other data slice, a requesting entity identifier, a copy of the partial task 1, or an access credential (e.g., a signature, a signed copy of the partial task 1). The DT execution module sends the slice request 734 to the other DST execution unit 36.

The DT execution module 90 of the other DST execution unit 36 receives the slice request 734 and may authorize the slice request 734 based on the request. For example, the DT execution module 90 of the other DST execution of 36 verifies a signature of the slice request 734. When the request is authorized, the DT execution module 90 of the other DST execution of 36 facilitates sending the at least one other data slice to the DST execution unit 36. The DST execution 36 stores the at least one other data slice (e.g., data slice 2) in the slice memory 700. The DT execution module 90 may determine whether the slice memory 700 contains every data slice required to execute partial tasks 1. When the DT execution module 90 determines that slice memory 700 contains every data slice required to execute partial tasks 1, the DT execution module 90 executes one or more partial tasks of partial tasks 1 on data slices retrieved from the slice memory (e.g., data slices 1, data slices 2) to produce partial results 708. For example, the DT execution module 90 aggregates data slice 1 and data slice 2 to reproduce the data record and executes the one or more partial tasks on the data record to produce the partial results 708. The DT execution module outputs the partial results 708 to the DST processing unit 16 and/or the user device 14. Alternatively, or in addition to, the DT execution module 90 of the other DST execution unit 36 may perform a partial task 2 on a data slice 2 to produce partial results 708.

FIG. 9A is a flowchart illustrating an example of obtaining a data record. The method begins at step 740 where a processing module (e.g., of a distributed task (DT) execution module) receives a data slice and an associated partial task. The method continues at step 742 where the processing module identifies a data record associated with the data slice. The identifying may be based on one or more obtaining a slice name of the data slice, performing a data record identifier lookup in a slice name to data list, or extracting a data record identifier from the data slice. When the data record includes another encoded data slice (at least one additional encoded data slice), the method continues at step 744 where the processing module generates a slice request. The processing module may determine whether the data record includes the other data slice based on at least one of performing any data record ID to slice name lookup, receiving a list of slice names, or a query. The generating of the slice request includes one or more of identifying a slice name associated with the other data slice, identifying another distributed storage and task (DST) execution unit associated with the other data source, generating a partial task field entry that includes at least a portion of the associated partial task, or generating a credential field entry that includes a signature.

The method continues at step 746 where the processing module outputs the slice request to the other DST execution unit. The method continues at step 748 where the processing module receives the other data slice from the other DST execution unit. The method continues at step 750 where the processing module performs the partial task on the data slice and the other data slice to produce partial results. The performing may include one or more of aggregating at least a portion of the data slice and at least a portion of the other data slice to produce the data record and executing at least a portion of the associated partial task on the data record to produce the partial results.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices, the method comprises:
  encoding data using a dispersed storage error encoding function to produce a plurality of sets of encoded data slices, wherein the encoded data slices of the plurality of sets of encoded data slices are arranged into a plurality of chunksets of encoded data slices;
  selecting a set of storage units for storing the plurality of chunksets;
  assigning a distributed computing task to each storage unit of the set of storage units;
  generating a unique key set for each storage unit of the storage units;
  encrypting each chunkset of encoded data slices with a corresponding one of the unique key sets to produce a plurality of encrypted chunksets; and
  sending an encrypted chunkset of the plurality of encrypted chunksets and an indication of a corresponding distributed computing task to each storage unit of the set of storage units for storage of the encrypted chunksets and execution of the distributed computing task.

2. The method of claim 1, wherein the distributed computing task includes one or more partial tasks.

3. The method of claim 2, wherein the selecting a set of storage units for storing the plurality of chunksets is based on at least one of: an assigned partial task for a corresponding storage unit, information regarding the corresponding storage unit, information regarding key generation and a pseudo random function.

4. The method of claim 1, wherein the indication of the distributed computing task for a storage unit of the set of storage units comprises at least one of:
  an indication that the distributed computing task was used to generate a corresponding unique key set; and
  an indication as to how the distributed computing task was used to generate the corresponding unique key set.

5. The method of claim 1, wherein the sending the indication of the distributed computing task to a storage unit of the set of storage units comprises:
  sending a corresponding partial task to the storage unit.

6. The method of claim 1, wherein the generating a unique key set for each storage unit of the storage units comprises:
  generating a unique key for each storage unit of the set of storage units that is used to encrypt a corresponding chunkset of encrypted slices.

7. The method of claim 1, wherein the generating a unique key set for each storage unit of the storage units comprises:
  generating a unique key for each storage unit of the set of storage units that is used to encrypt one or more slices of the corresponding chunkset of encrypted slices.

8. The method of claim 1, wherein the generating a unique key set for each storage unit of the storage units comprises:
  identifying an assigned partial task for the one of the storage units; and
  performing a deterministic mathematical function on bits of the assigned partial task to create a value.

9. The method of claim 1, wherein the generating a unique key set for each storage unit of the storage units comprises:
  determining a public key of a public/private key pair for the one of the storage units; and
  using the public key to generate the unique key set.

10. A computing device of a storage network comprises:
  a first module, when operable within the computing device, causes the computing device to:
    encode data using a dispersed storage error encoding function to produce a plurality of sets of encoded data slices, wherein the encoded data slices of the plurality of sets of encoded data slices are arranged into chunksets of encoded data slices;
    select a set of storage units for the chunksets of slices; and
    assign one or more distributed computing tasks to each storage unit of the set of storage units;
  a second module, when operable within the computing device, causes the computing device to:
    generate a unique key set for each storage unit of the set of storage units based on at least one of: an assigned partial task for a corresponding storage unit, information regarding the storage unit, information regarding key generation and a pseudo random function; and encrypt a chunkset of the chunksets of slices with a corresponding one of the unique key sets to produce an encrypted chunkset; and a third module, when operable within the computing device, causes the computing device to:

send the encrypted chunkset and an indication of a corresponding distributed computing task to the storage unit for storage of the encrypted chunkset and execution of the distributed computing task on the encrypted chunkset.

11. The computing device of claim 10, wherein the indication of the distributed computing task for the storage unit comprises at least one of:

an indication that the distributed computing task was used to generate a corresponding unique key set; and an indication as to how the distributed computing task was used to generate the corresponding unique key set.

12. The computing device of claim 10, wherein the third module functions to send the indication of the distributed computing task to the storage unit by:

sending a corresponding an assigned partial task to the storage unit.

13. The computing device of claim 10, wherein the second module functions to generate a unique key set for each storage unit of the set of storage units by:

generating a unique key that is used to encrypt a corresponding chunkset of encrypted slices.

14. The computing device of claim 10, wherein the second module functions to generate a unique key set for each storage unit of the set of storage units by:

generating multiple unique keys, wherein each of the multiple unique keys is used to encrypt a corresponding chunkset of encrypted slices.

15. The computing device of claim 10, wherein the second module functions to generate a unique key set for each storage unit of the set of storage units by:

identifying an assigned partial task for a corresponding storage unit; and performing a deterministic mathematical function on bits of the assigned partial task to create a value.

16. The computing device of claim 10, wherein the second module functions to generate a unique key set for each storage unit of the set of storage units by:

determining a public key of a public/private key pair for a corresponding storage unit; and utilizing the public key to generate the unique key set.

17. A method for execution by one or more processing modules of one or more computing devices of a storage network, the method comprises:

encoding data using a dispersed storage error encoding function to produce a plurality of sets of encoded data slices, wherein the encoded data slices of the plurality of sets of encoded data slices are arranged into a plurality of chunksets of encoded data slices;

selecting a set of storage units for storing the plurality of chunksets;

generating a unique key set for each storage unit of the set of storage units;

encrypting each chunkset of encoded data slices using a corresponding one of the unique key sets to produce a plurality of encrypted chunksets; and sending an encrypted chunkset of the plurality of encrypted chunksets to each storage unit of the set of storage units.

18. The method of claim 17, further comprising:

sending an indication of a corresponding one or more distributed computing tasks to each storage unit of the set of storage units.

19. The method of claim 18, wherein the one or more distributed computing tasks includes a partial task.

20. The method of claim 19, wherein the unique key is generated based on the partial task.

\* \* \* \* \*